(12) United States Patent
Rogowitz et al.

(10) Patent No.: US 8,350,843 B2
(45) Date of Patent: Jan. 8, 2013

(54) VIRTUAL HAND: A NEW 3-D HAPTIC INTERFACE AND SYSTEM FOR VIRTUAL ENVIRONMENTS

(75) Inventors: Bernice E. Rogowitz, Ossining, NY (US); Paul Borrel, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 974 days.

(21) Appl. No.: 12/047,848

(22) Filed: Mar. 13, 2008

(65) Prior Publication Data

US 2009/0231272 A1 Sep. 17, 2009

(51) Int. Cl.
*G09G 5/00* (2006.01)
(52) U.S. Cl. ........ 345/419; 345/420; 345/427; 345/156; 345/158; 345/173
(58) Field of Classification Search .......... 345/156–173, 345/419–427
See application file for complete search history.

(56) References Cited

U.S. PATENT DOCUMENTS

| | | | |
|---|---|---|---|
| 6,310,604 B1* | 10/2001 | Furusho et al. ............. | 345/156 |
| 7,009,595 B2 | 3/2006 | Roberts et al. | |
| 7,113,177 B2* | 9/2006 | Franzen ..................... | 345/173 |
| 7,245,292 B1 | 7/2007 | Custy | |
| 7,259,761 B2 | 8/2007 | Shih et al. | |
| 7,308,314 B2 | 12/2007 | Havey et al. | |
| 7,324,094 B2 | 1/2008 | Moilanen et al. | |
| 7,336,266 B2 | 2/2008 | Hayward et al. | |
| 7,339,574 B2 | 3/2008 | Kyung et al. | |
| 2003/0057973 A1 | 3/2003 | Nojima et al. | |
| 2003/0117371 A1 | 6/2003 | Roberts et al. | |
| 2003/0151597 A1* | 8/2003 | Roberts et al. ............. | 345/173 |
| 2004/0046777 A1* | 3/2004 | Tremblay et al. .......... | 345/702 |
| 2005/0231468 A1 | 10/2005 | Chen et al. | |
| 2006/0119578 A1 | 6/2006 | Kesavadas et al. | |
| 2008/0261165 A1* | 10/2008 | Steingart et al. ............ | 433/24 |
| 2010/0261526 A1* | 10/2010 | Anderson et al. ........... | 463/31 |

OTHER PUBLICATIONS

M. Ohka, et. al., "Figure and texture presentation capabilities of a tactile mouse equipped with a display pad of stimulus pins", Robotica, vol. 25, Feb. 2007, pp. 451-460.*
M. Shimojo et al., "Human Shape Recognition Performance for 3D tactile Display", IEEE Transactions on Systems, Man and Cybernetics, Part A: Systems and Humans, vol. 29, Issues 6, Nov. 1999, pp. 637-644.*
Y. Ikei, M. Shiratori, "TextureExplorer: A Tactile and Force Display for Virtual Textures", Proc. of the 10th Symposium on Haptic Interfaces for Virtual Environment and Teleoperator Systems, Mar. 24-25, 2002, pp. 327-334.*
Yang, et al., "Quantitative Tactile Display Device with Pin-Array Type Tactile Feedback and Thermal Feedback".

(Continued)

*Primary Examiner* — Jin-Cheng Wang
(74) *Attorney, Agent, or Firm* — Scully, Scott, Murphy & Presser, P.C.; Gail H. Zarick, Esq.

(57) ABSTRACT

The present invention discloses a creation of a virtual hand, body part, or tool in a virtual environment, controlled by a new 3-D haptic interface for virtual environments. There is also the provision of a method and arrangement applicable to computer systems for creating a virtual environment, which facilitates a user to touch, feel, edit, and interact with data about the objects, surfaces, and textures in the environment. There is also a provision for multiple virtual hands operating in the same virtual world, so that users can work collaboratively in the virtual world; they can touch, feel and edit the data in the virtual world, including data about the other users' virtual hands.

21 Claims, 3 Drawing Sheets

OTHER PUBLICATIONS

Iwata, et al., "Project FEELEX: Adding Haptic Surface to Graphics".
VRlab, "FEELEX", pp. 1-3.
Dan Overholt, "The MATRIX: A Novel Controller for Musical Expression".
Wagner, et al., "A Tactile Shape Display Using RC Servomotors", Harvard BioRobotics, pp. 1-8.
Office Action dated Jul. 29, 2011 received in related U.S. Appl. No. 12/047,771.

* cited by examiner

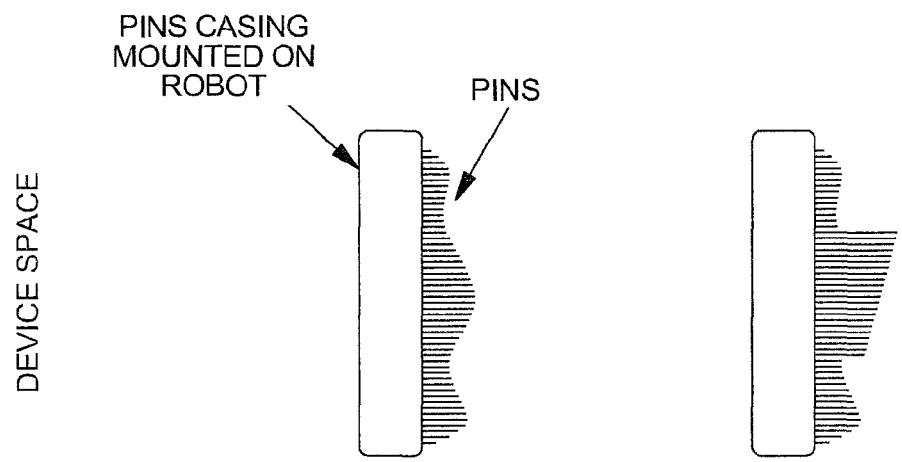
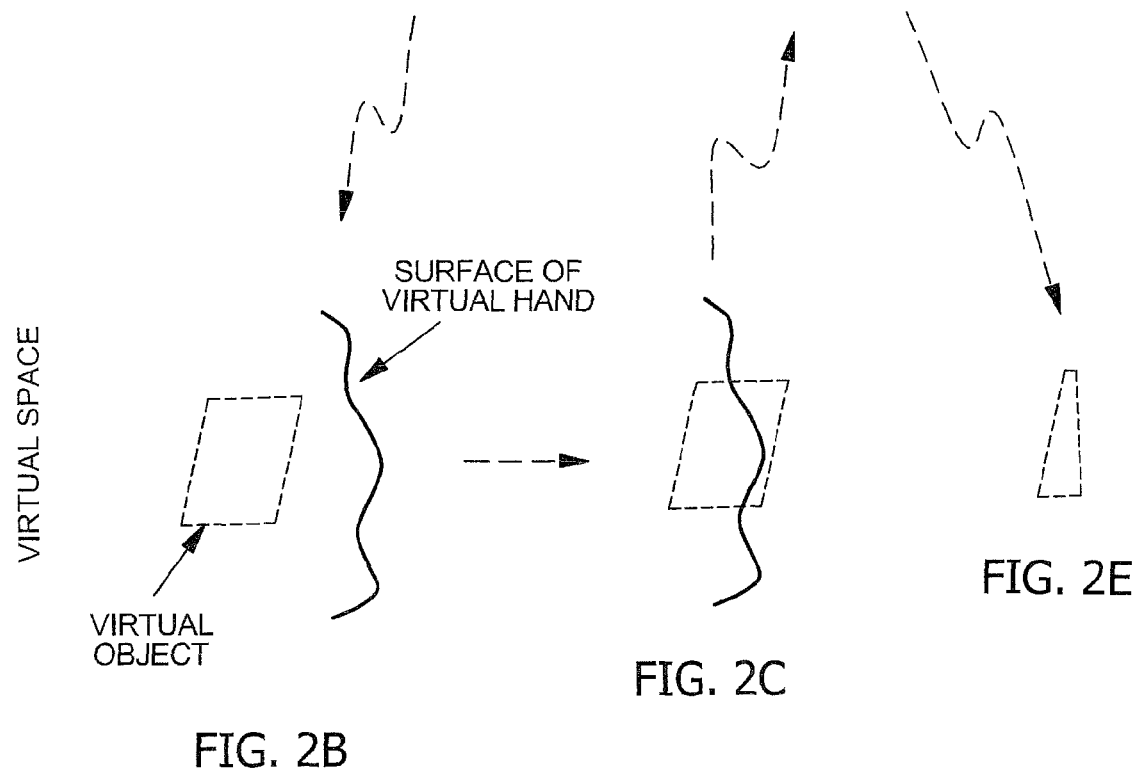

MAXIMUM ALLOWABLE
PIN DISPLACEMENT

DEVICE SPACE

VIRTUAL SPACE

US 8,350,843 B2

VIRTUAL HAND: A NEW 3-D HAPTIC INTERFACE AND SYSTEM FOR VIRTUAL ENVIRONMENTS

BACKGROUND OF THE INVENTION

1. Field of the Invention

The present invention relates to the creation of a virtual hand representing new 3-D haptic interface for virtual environments. Moreover, the invention relates to the provision of a method and arrangement applicable to computer systems for creating a virtual environment, which facilitates a user to touch, feel, edit, and interact with data, either alone, or collaboratively with other users.

2. Discussion of the Prior Art

In presently known state-of-the art 3-D and computer graphics systems, a user may generally interact with the computer-generated environment by visually utilizing standard interfaces, for instance, such as a mouse or joystick, whereby the ability to feel or touch the environment is limited in scope. A data glove can be employed to roughly track coarse hand positions, and to provide a projection thereof it in a 3-D space, however, the user cannot feel or touch the environment. A limited degree of touch sensitivity can be added by imparting small piezoelectric stimulations to the user's hand, but the usefulness of this interface is limited to collision detection and very coarse or basic graphical object sampling. More recently, haptic interfaces have been introduced which facilitate a feedback when probing a virtual object with a single point of contact (e.g., Phantom), and by integrating this capability into a robot arm this has resulted in a greater range for exploration (e.g., Virtuose). Nevertheless, in all these systems, the interface to the computer-graphics world is very limited, inasmuch as the user does not possess the sense of touching a real object, feeling its texture, judging or modifying its surface, moving or shaping the 3-D object, or responding tactilly to an object that is thrown at the user.

Among various publications, which are concerned with similar aspects of the technology, the following are deemed to be of interest in the provision of haptic interface arrangements and methods.

Hayward, et al., U.S. Pat. No. 7,336,266 B, disclose haptic devices employable with diverse computer and video interface-user devices.

Shih, et al., U.S. Pat. No. 7,259,761 B2, disclose systems and methods employed by a user for manipulation of tools sculpting virtual objects in a haptic virtual reality environment.

Nojima, et al., U.S. Patent Publication No. 2003/0057973 A1, disclose a smart tool for real-time measurement of changing environment and displays to a user and generating haptic sensations thereof.

Kyung, et al., U.S. Pat. No. 7,339,574 B2, pertains to a haptic mouse interface system adapted to provide force and tactile feedbacks to a user's fingers and arm.

Havey, et al., U.S. Pat. No. 7,308,314 B2, disclose a sensory substitution device, employed for vision prosthesis, or low-vision enhancement by using thermal sensing.

Roberts, et al., U.S. Patent Publications No. 2003/0117371 A1, pertains to the scanning of tactile graphic displays for localized sensory stimulation.

However, none of the above-reference publications have any significant bearing on the novelty and advantages which are attendant to the present invention.

A commonly assigned co-pending U.S. patent application Ser. No. 12/047,771, the disclosure of which is incorporated herein by reference, introduced the concept of using an array of pins, which is controlled by microactuators to transduce the data values associated with a computer-generated surface in a manner letting the user to a) sense the surface and its constraints; and b) control and edit the shape of that surface. In that interface, the array of pin is attached to a platform that allows the user to control the viewing angle of the surface. This, however, is not a Virtual Hand since it does not allow the user to move his/her hand around the space using six (6) degrees of freedom, or to react in response to a moving object.

According to the present invention, there are provided distinct advances over the current state-of-the-technology, by enabling a user to move his or her hand around a space in six (6) degrees of freedom, or to be able to react to a moving object.

SUMMARY OF THE INVENTION

The present invention discloses the concept of a 3-D interface enabling a user to move a virtual hand through a computer graphics environment, allowing the user to touch and feel the textures, surfaces and objects in the environment, and to deform and shape these surfaces. This novel interface provides a rich tactile appreciation of computer-graphics objects, by providing a new dimension in 3-D graphical environments, whether immersive (e.g., Virtual World) or merely for providing a simple computer-generated display. The interface allows the user to obtain a realistic sense of the touch and feel of the objects being represented, and provides a mechanism for groups of users to work together in order to interact with objects in virtual space, including each other's virtual hands. This opens the door for people or users subject to vision impairments to sense and control 3-D surfaces, textures, and objects, and also facilitates for virtual training, e.g., allowing one user's hand to shape and control another user's hand.

In effect, the present invention brings a user's hand into a virtual world, enabling the hand to feel and manipulate the objects present in that virtual space. The user places his/her hand on an array of pins, which is mounted on a robot arm, whereby the surface formed by the tips of the pins is represented as a surface in the virtual world, which is deemed to be a representation of a "virtual hand" in that virtual space. Movement of the robot arm is interpreted as movement of the virtual hand in the virtual world, whereby displacement of the pins in the user's palm and fingers is interpreted as a displacement of the palm and fingers of the virtual hand in the virtual world. Forces exerted by the virtual world on the virtual hand are applied to the users' hand through movements of the robot arm and displacements of the pins. Hereby, such forces can occur when the virtual hand "touches" objects and surfaces in the virtual world, or when objects in the virtual world are thrown at the virtual hand (e.g., a virtual baseball), or when it touches another virtual hand located in the same virtual world. The particular function and detailed stricture of one implementation of the transducer device required to sense and exert force on a computer-generated surface, is described in fuller detail and illustrated particularly in FIGS. 4, 5a and 5b in the above-referenced commonly assigned application (Ser. No. 12/047,771).

Pursuant to the invention, a computer program creates a visualization of a virtual world, in which the virtual hand is visualized as a representation of a hand in that virtual world. In one aspect or instant, the user simply visualizes the virtual world and the image of the hand on a traditional computer display, where in a second instance, the user is immersed in the virtual world while wearing a head-mounted display.

A physical embodiment of the invention contemplates the utilization of an array of pins mounted on a robot arm. This array of pins is designed to be a transducer of forces to and from the user, using a methodology such as described the referenced co-pending application. The array of pins is attached to a robot arm with 6 degrees of freedom, such as, for example, the Virtuose 6D35-45 from Haption, www.haption-.com or the Phantom from SensAble http://www.sensable-.com/.

Additionally, the present invention can be ascertained as representing an add-on to a classic robot haptic system, such as the Virtuose, taking advantage of the force feedback mechanism and visualization/virtual world software typically provided thereby. This invention uses essentially the same control system as the Virtuose, which allows a user to move a virtual object (in the parent case, a virtual hand) through a virtual world, however, the uniqueness of this invention resides in that it provides a haptic interface that adds a fine-grained visually guided touch and the ability to feel the physical properties and forces in a virtual environment, heretofore lacking.

In the Virtuose, Phantom systems, and other similar equipment, whenever the virtual hand makes contact with an object in the virtual world, the robot's control system prevents further motion, so the virtual hand will not penetrate any object in the virtual world. Contrasting, in the present invention, the motions of pins and robots are combined so as to provide users with the sense of touch on the virtual objects, as if the users were actually touching real objects. Thus, the user's hand is deformed by an amount it would have deformed on a real object with the same physical characteristics as the virtual object.

Moreover, unlike the Virtuose or the Phantom systems, which only impact information to the user about a single point in virtual space at a time, in this system, the user has a touch feedback about an entire area, and can move the virtual hand across an object to feel its shape and texture.

In addition to the features of the pin array described in the co-pending application, the array of pins in this invention imparts a force to the user's palm and fingers, which acts as a spring and maintains contact between the pins and the user's fingers and palm at all times.

According to the invention, no special registration process is required to register the hand to the pins on the device, since the surface created by the imprint of the user's hand on the array of pins serves directly as the representation of his/her hand in the virtual world. The surface of the pin tips defines the touching surface of the virtual hand in the virtual space. Because no special registration process is required, the physical object controlling the pins can readily assume many forms, including: arbitrary hand positions (e.g. open, curved, first, etc.); other body parts; and inanimate objects that can be used as tools for sensing properties of the virtual world. In the disclosure, there is a continued reference to a virtual hand, regardless of the shape on the pin surface.

Sensing and Moving Objects in the Virtual World

The control algorithm described hereafter covers a wide range of cases representing movements in the real world, whereby information about the hardness, softness or elasticity of an object can be communicated by the array of pins. The assembly enables the user to not only feel a stationary object, but to move an object, and to sense a moving object. The array of pins and the robot arm react to contact between the virtual hand and the virtual object through pin displacements and robot arm motions that are calculated to provide a realistic impression of touch, feel and motion to the user.

In all instances, the representation of the user's hand moves through the virtual world, with six (6) degrees of freedom in movement. When the virtual hand encounters a virtual object, some set of pins on the device will be displaced by an amount, which is proportional to the reaction force exerted by the object, as explained below. This movement of the pin (or pins) is limited to a maximum value that corresponds to a physical displacement that ensures user comfort. Moreover, a light touch of an object will cause the pins on the device to push lightly onto the hand; a heavy touch will cause a greater displacement of the pins onto the surface of the fingers and palm of the user, producing a realistic touch sensation.

Examples of Usage Scenarios

Sensing the Surface Shape and Texture of the Object

The virtual hand can move over an object in order to sense the texture (e.g., bumpy, smooth, corrugated) and shape (e.g., convex, concave, spherical), thereof, at locations where the pins displace to communicate these physical dimensions.

Editing an Object, Surface or Texture

The virtual hand can move to an object, surface or texture, and by pressing down on the array of pins on the haptic device, the user can change the shape of that object, surface or texture Moving an Object When the virtual hand is pushing on an object and if the motion of the pins goes beyond the allowed range, this motion will be interpreted as exerting a force on the object. This will result in either 1) the object moves, or 2) the robot prevents further hand motion (e.g., such as trying to move a large boulder).

Hard vs. Soft Object

The displacement of the pins when an object is encountered can be modulated based on the physical characteristics of the virtual object. For example, a very hard object will cause a larger displacement of the pins, while a softer or more elastic object will produce a smaller displacement of the pins. A library of different physical properties and their forces—spongy, etc, could be utilized.

Sensing Object Movement and Catching a Moving Object

The control algorithm also handles the case where the hand is static and an object in the virtual world moves and encounters the virtual hand. When the pins displace beyond their allowable range of motion, the robot arm will respond by moving backwards to compensate for the object's motion.

Collaborative Work

Multiple users can each have a haptic device each driving a virtual hand in the same virtual environment, allowing multiple users to edit, touch, feel and manipulate the surfaces, objects, and textures in the environment.

Mutual Touch

The virtual object can be the virtual hand of another user, thus allowing hand contact mediated by a virtual world. For example, virtual hand wrestling and hand shaking can be enabled.

Beyond Hands

An extension of the above is that the user is not limited to using a hand. For example, he/she could place the face onto an array of pins which could drive a virtual face in the virtual world. This virtual face could be touched by another virtual face, or by a virtual hand.

Applications for these above-mentioned usage scenarios include interactive computer games, virtual shopping, virtual masseuse avatar, virtual pottery, virtual sports, tactile skill learning, training, Computer Aided Design, and so forth.

Accordingly, it is an object to provide a novel method adaptable to computer systems and usage to be able to create, by means of a virtual hand, a virtual environment which enables a user to touch, feel and interact with data.

Another object of the present invention resides in the provision of an arrangement operable through a virtual hand to facilitate the creation of a virtual environment which enables a user to touch, feel and interact with data.

BRIEF DESCRIPTION OF THE DRAWINGS

Further aspects and advantages of the invention may be readily ascertained from the following detailed description of exemplary embodiments thereof, taken in conjunction with the accompanying drawings; in which:

FIGS. 2A through 2E illustrate, respectively, device spaces and virtual spaces in implementing the invention, showing examples of pin displacement.

DETAILED DESCRIPTION OF THE INVENTION

Figure 1:
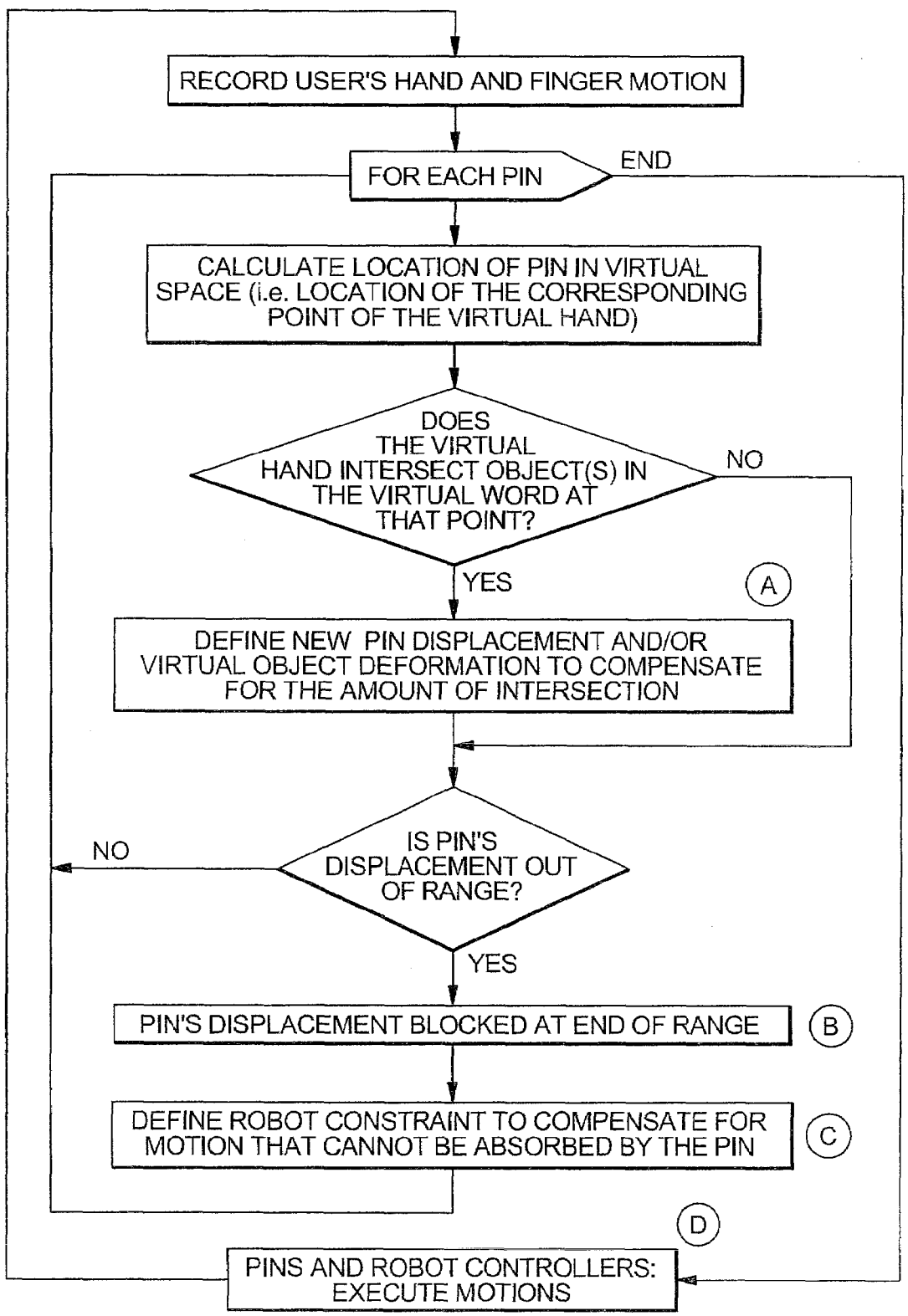
FIG. 1 illustrates a control algorithm for implementing the three-dimensional haptic interface for virtual environments.

Referring now in particular to FIG. 1 of the drawings, the control algorithm, as presented, manages the movements of pins and of a robot arm, as described in detail and illustrated in FIG. 5a in the above-referenced co-pending application, whereby it assumes that an endless loop is controlling the pins and the robot. Such control of the pins and the robot results in ensuring that there is no intersection between the virtual hand and the virtual objects in the virtual space. Whenever the user or object motion would result in an intersection between the virtual hand and the object(s), the control algorithm prevents this intersection, which it does by displacing the pins on the pin assembly, and if this is not possible because a pin range of motion has been exceeded, it changes the pin assembly position through an applicable motion of the robot.

It is the displacement of the pins on the pin assembly that provides the sense of touch to the user. The movement of the robot allows the user to feel objects as they move in the virtual space, either because the user pushes them or the objects are impinging upon the user.

This control algorithm assumes no specific sequence of actions and therefore handles instances when a contact between virtual hand and virtual objects occurs because the user displaces the pins and/or the pins assembly mounted on the robot, or because virtual objects move in the virtual space.

The endless outer loop of the algorithm first records the location of the pins and the robot. The location and shape of the surface of the virtual hand is derived from this information. For each point of the virtual surface corresponding to each pin, the system tests whether there is an intersection between the virtual hand, at that point, and any objects located in the virtual space. Detecting an intersection results in adjusting the pin's displacement in such a manner that the resulting virtual surface is deformed (Step A). For a hard virtual object, the amount of displacement of the pin is equal to the amount of intersection, whereas for a soft or elastic virtual object, the virtual object also deforms and the displacement is shared between the pin and the virtual object. In both instances, this displacement results in eliminating the intersection between the virtual object and the virtual hand.

The pins possess a predefined range of motion, which can either be defined as the maximum extension of the pin on the pin assembly or some predefined range that is deemed comfortable for the user. Whenever a pin would exceed this range, the pin is blocked at the end of the range and a constraint of motion is defined for the robot. This constraint will result in producing a motion of the robot arm that compensates for the displacement that could not be absorbed by the pin (Steps B and C).

The robot controller (Step D) accumulates several constraints of motion, as described above, and can calculate from them a natural motion of the pin assembly. For example, if a single point of the virtual hand is in contact with a virtual object, the robot controller will allow a rotation of the pin assembly around the extremity of the corresponding pin by maintaining this point at a fixed location in space. The robot arm has a given number of degrees of freedom that can be used to accommodate one or more spatial constraints to position the pins in space. A mathematical model allows the robot controller to calculate the displacement of its articulations to maintain the constraints. This type of mathematical formulation can be found in robotics literature, and is similar to that of the controller of the Virtuose robot arm, it being considered prior art and not described herein.

Examples of the effect of executing the control algorithm of FIG. 1 are illustrated in FIG. 2 and FIG. 3, whereby these figures represent both the behavior of the pins and of the pin assembly in the device space (top portions of the figures) and the corresponding behavior of the virtual hand and virtual objects in the virtual space (bottom portions of the figures).

Referring in particular to FIGS. 2a through 2e of the drawings, FIG. 2a and 2b illustrates the part of the algorithm that deforms the surface of the pins, which is in contact with the user's hand, when a virtual object enters in contact with the virtual hand. FIG. 2c shows a relative position of the virtual hand and a virtual object where the virtual object impinges on the virtual hand. FIG. 2d illustrates the effect of displacing the pins in a manner consistent with FIG. 1, Step A. The new pin surface represented on FIG. 2d now reflects the location of the impinging virtual object. Since the user can touch the pin surface, the user now has the illusion that his/her hand is actually "touching" the virtual object. The surface of the virtual hand is subsequently recalculated to match the new pins surface on the device (FIG. 2e).

Figure 3A:
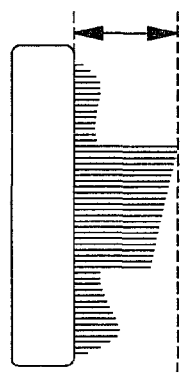
FIGS. 3A through 3F illustrate, respectively, examples of a robot motion and representing the device space and virtual space, pursuant to the present invention.
Figure 3D:
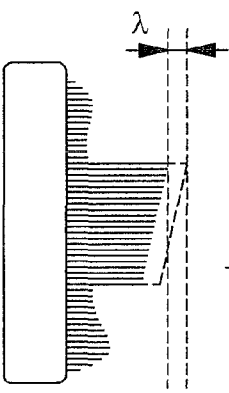
Figure 3E:
Figure 3B:
Figure 3C:
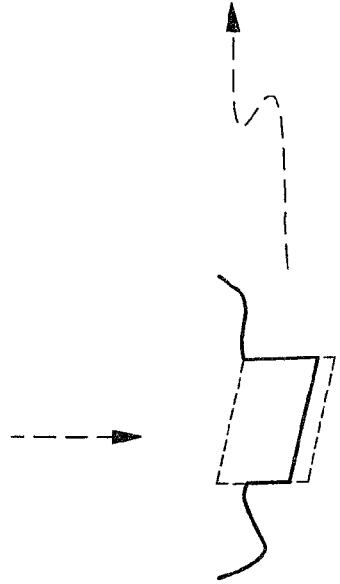
Figure 3F:

The foregoing is also exemplified generally diagrammatically in FIGS. 3a through 3f of the drawings, in which:

FIGS. 3a through 3f illustrate the part of the algorithm that handles cases when a pin reaches the end its allowable range of motion. FIG. 3a and FIG. 3b illustrate a state where one the pins has reached the end of its allowable range of motion. Since a relative displacement of the virtual hand and the virtual object such as the one depicted on FIG. 3c would result in some of the pins exceeding their allowable range of motion (FIG. 3d), the robot (through a constraint added in FIG. 1, Steps C and D) displaces the pins assembly in such a way that all pins are within allowable range (FIG. 3e). This in turn results in a new virtual hand surface that does not impinge on the virtual object (FIG. 3f).

From the foregoing, it becomes readily apparent that the present invention is directed at a unique inventive concept in producing a virtual hand, which facilitates a new 3-D haptic interface for virtual environments, particularly in conjunction with the retrieval of data from computer systems.

While the present invention has been particularly shown and described with respect to preferred embodiments thereof, it will be understood by those skilled in the art that the foregoing and other changes in forms and details may be made without departing from the scope and spirit of the present invention. It is therefore intended that the present invention not be limited to the exact forms and details described and illustrated, but fall within the scope of the appended claims.

What is claimed is:

1. A method of producing a 3-D interface facilitating a user to move a virtual hand or body part or tool through a computer graphics environment defining a "virtual space" having representations of objects and corresponding surfaces, said method comprising:

provided, in communication with a computer device forming said computer graphics environment, a haptic device including a robot arm mounting an array of pins, said pins having tips for contacting the hand of the user, said tips of the array of pins providing a touching surface of the virtual hand, said virtual hand represented in said virtual space corresponding to an imprint resulting from placing the user's hand on said touching surface;

communicating control signals, from said haptic device to said computer device, for moving the virtual hand in said defined virtual space corresponding to movement imparted to the haptic device responsive to said pin tips contacting and being displaced by motion of the user's hand on the touching surface;

representing virtual objects encountered by said virtual hand in said virtual space via the haptic device;

communicating, via said computer device, tactile information about a virtual object's characteristics, in which the virtual object deforms the touching surface;

receiving, at said haptic device, said tactile information and responsively imparting said tactile information about the surface deformation to the array of pins, to result in pin displacements such that a user's experience of touching virtual objects and virtual surfaces in said virtual space are sensed by the user through the haptic device; and communicating, via said haptic device, information to said computer device for transforming the represented virtual object in said computer graphics environment responsive to a user manipulating said array of pins on the haptic device, said transforming including editing or changing a shape of a virtual object, the virtual object's surface or texture wherein pins of said array of pins possess a predefined range of motion, said method including:

detecting, for each pin, when that pin reaches an end said predefined range of motion; and for each pin attempting to exceed its predefined range, producing motion of said robot arm to compensate for a displacement that could not be absorbed by the pin, whereby forces applied to the user's hand touching said pins are encountered upon said virtual hand seemingly touching objects and surfaces in said virtual environment.

2. The method as claimed in claim 1, wherein said robot arm mounting said array of pins possess 6 degrees of freedom of movement.

3. The method as claimed in claim 1, wherein said virtual hand is movable over a virtual object so as to sense a texture and shape thereof at locations where pins of said array are displaced by the user's hand to communicate said texture and shape to the user.

4. The method as claimed in claim 3, wherein said virtual object comprises the virtual hand of another user, facilitating hand contact mediated and manipulated in a virtual world.

5. The method as claimed in claim 1, wherein said body part comprises a user's face which is capable of transporting a virtual face into a virtual world so as to be touchable by another virtual face or virtual hand.

6. The method as claimed in claim 1, wherein said 3-D interface is adapted to generate scenarios in a virtual environment including, selectively, virtual shopping, interactive computer games, virtual masseuse avatar, virtual pottery, virtual sports, tactile skill learning, training aids, and computer-aided designs.

7. The method as claimed in claim 1, wherein said method is implementable on computer systems so as to create, through said virtual hand or body part, a virtual environment enabling a user to touch, feel and interact with data.

8. The method as claimed in claim 1, wherein forces applied by the users' hand on the haptic device allow the user to edit and shape the objects, textures and surfaces in the virtual world.

9. The method as claimed in claim 1, wherein the 3-D interface provides a collaborative mechanism whereby users in different physical environments can interact on the same computer-generated model, where each user can feel, touch, edit and manipulate the objects, surfaces and textures in the computer-generated virtual environment.

10. The method as claimed in claim 1, wherein said tactile information about the surface deformation imparted to the array pins includes information representing both a shape and elasticity of a virtual surface of an object represented in the defined virtual space.

11. The method as claimed in claim 1, wherein said responsively imparting said tactile information about the surface deformation to the array pins further comprises:

displacing, via movement of said robot arm, said pin array in a manner such that that all pins of said array are within an allowable range.

12. The method as claimed in claim 1, wherein a constraint of motion is defined for said robot arm, said motion of said robot arm produced in response to said detecting pins reaching an end said predefined range of motion being based on said constraint.

13. A system for producing a 3-D interface facilitating a user to move a virtual hand or body part through a computer graphics environment having representations of objects and corresponding surfaces, said system comprising:

a haptic device, in communication with a computer device forming said computer graphics environment, said haptic device including a robot arm mounting an array of pins, said pins having tips for contacting a hand of the user, said tips of the array of pins providing a touching surface of the virtual hand, said virtual hand represented in said virtual space corresponding to an imprint resulting from placing the user's hand on said touching surface;

said haptic device communicating control signals to said computer device for moving the virtual hand in said defined virtual space corresponding to movement imparted to the haptic device responsive to said pin tips contacting and being displaced by motion of the user's hand on the touching surface;

said computer device representing virtual objects encountered by said virtual hand in said virtual space via the haptic device by communicating tactile information about a virtual object's characteristics, in which the virtual object deforms the touching surface;

said haptic device receiving said tactile information and responsively imparting said tactile information about the surface deformation to the array of pins, to result in pin displacements such that a user's experience of touching virtual objects and virtual surfaces in said virtual space are sensed by the user through the haptic device, and said haptic device further communicating information to said computer device for transforming the represented virtual object in said computer graphics environment responsive to a user manipulating said array of pins on the haptic device, said transforming including editing or changing a shape of a virtual object, a virtual object's surface or texture, wherein pins of said array of pins possess a predefined range of motion, said computer device detecting, for each pin, when that pin reaches an end said predefined range of motion; and for each pin attempting to exceed its predefined range, said haptic device receiving signals to produce motion of said robot arm to compensate for a displacement that could not be absorbed by the pin, whereby forces applied to the user's hand touching said pins are encountered upon said virtual hand seemingly touching objects and surfaces in said virtual environment.

14. The system as claimed in claim 13, wherein said robot arm mounting said array of pins possess 6 degrees of freedom of movement.

15. The system as claimed in claim 14, wherein said virtual hand is movable over a virtual object so as to sense a texture and shape thereof at locations where pins of said array are displaced by the user's hand to communicate said texture and shape to the user.

16. The system as claimed in claim 15, wherein said virtual object comprises the virtual hand of another user, facilitating hand contact mediated and manipulated in a virtual world.

17. The system as claimed in claim 13, wherein said body part comprises a user's face which is capable of transporting a virtual face into a virtual world so as to be touchable by another virtual face or virtual hand.

18. The system as claimed in claim 13, wherein said 3-D interface is adapted to generate scenarios in a virtual environment including, selectively, interactive computer games, virtual shopping, virtual masseuse avatar, virtual pottery, virtual sports, tactile skill learning, training aids, and computer-aided designs, and is implementable on computer systems so as to create, through said virtual hand or body part, a virtual environment enabling a user to touch, feel and interact with data.

19. The system as claimed in claim 13, wherein said tactile information about the surface deformation imparted to the array pins includes information representing both a shape and elasticity of a virtual surface of an object represented in the defined virtual space.

20. The system as claimed in claim 13, wherein said responsively imparting said tactile information about the surface deformation to the array pins further comprises:

displacing, via movement of said robot arm, said pin array in a manner such that that all pins of said array are within an allowable range.

21. The system as claimed in claim 13, wherein a constraint of motion is defined for said robot arm, said motion of said robot arm produced in response to said detecting pins reaching an end said predefined range of motion being based on said constraint.

* * * * *